United States Patent
Koshimae

(10) Patent No.: US 8,982,161 B2
(45) Date of Patent: Mar. 17, 2015

(54) IMAGE DATA PROCESSING DEVICE, IMAGE DATA PROCESSING METHOD, AND PROGRAM

(75) Inventor: Hidenari Koshimae, Tokyo (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 13/071,395

(22) Filed: Mar. 24, 2011

(65) Prior Publication Data

US 2011/0242135 A1  Oct. 6, 2011

(30) Foreign Application Priority Data

Mar. 31, 2010  (JP) .................. P2010-083854

(51) Int. Cl.
  *G09G 5/00*  (2006.01)
  *G06T 1/60*  (2006.01)
  *G09G 5/39*  (2006.01)
  *H04N 1/00*  (2006.01)
  *H04N 1/41*  (2006.01)

(52) U.S. Cl.
  CPC ......... *H04N 1/00442* (2013.01); *H04N 1/0045* (2013.01); *H04N 1/00453* (2013.01); *H04N 1/00458* (2013.01); *H04N 1/00915* (2013.01); *H04N 1/41* (2013.01)
  USPC ............................ 345/684; 345/530; 345/531

(58) Field of Classification Search
  CPC ............ G09G 5/14; G09G 5/346; G09G 5/34
  USPC .................................................. 345/530, 531
  See application file for complete search history.

(56) References Cited

U.S. PATENT DOCUMENTS

| | | | |
|---|---|---|---|
| 6,384,846 B1 * | 5/2002 | Hiroi | 715/794 |
| 6,633,314 B1 * | 10/2003 | Tuli | 715/744 |
| 6,967,664 B1 * | 11/2005 | Taylor et al. | 345/620 |
| 7,072,404 B2 * | 7/2006 | Itokawa | 375/240.28 |
| 7,242,847 B1 * | 7/2007 | Davies et al. | 386/278 |
| 7,437,007 B1 * | 10/2008 | Augustine et al. | 382/235 |
| 8,022,970 B2 * | 9/2011 | Odagawa | 345/684 |
| 2004/0093345 A1 * | 5/2004 | Kobayashi | 707/102 |
| 2006/0149833 A1 * | 7/2006 | Dan et al. | 709/218 |
| 2009/0109199 A1 | 4/2009 | Kitagawa | |
| 2010/0057566 A1 * | 3/2010 | Itzhak | 705/14.53 |
| 2010/0129053 A1 * | 5/2010 | Ito | 386/69 |

FOREIGN PATENT DOCUMENTS

JP  2009-109880  5/2009

* cited by examiner

*Primary Examiner* — Joni Richer
(74) *Attorney, Agent, or Firm* — Sherr & Jiang, PLLC

(57) ABSTRACT

There is provided an image data processing device including a display control unit for controlling display of an image on a display device, a decoding priority setting unit for setting a decoding priority in each of image data of a plurality of images that may be displayed on a display screen of the display device by the display control unit, a decoding unit for performing a decoding process on each image data according to the decoding priority set by the decoding priority setting unit, and a storage unit for storing each decoded image data subjected to the decoding process by the decoding unit.

18 Claims, 14 Drawing Sheets

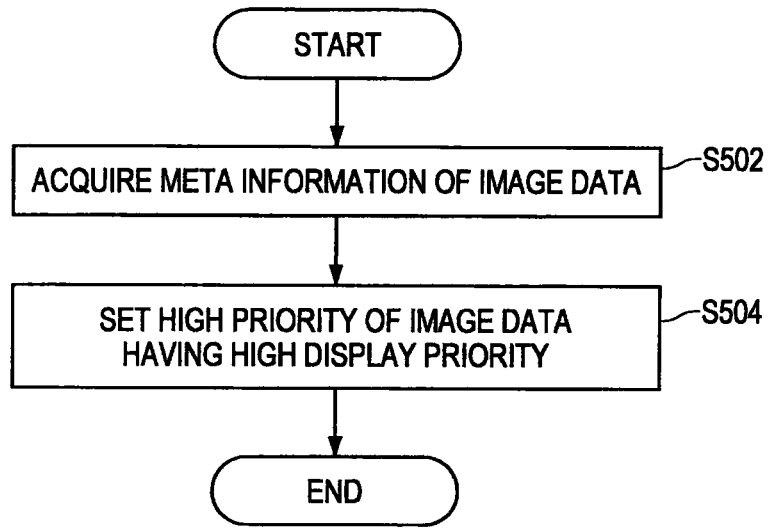
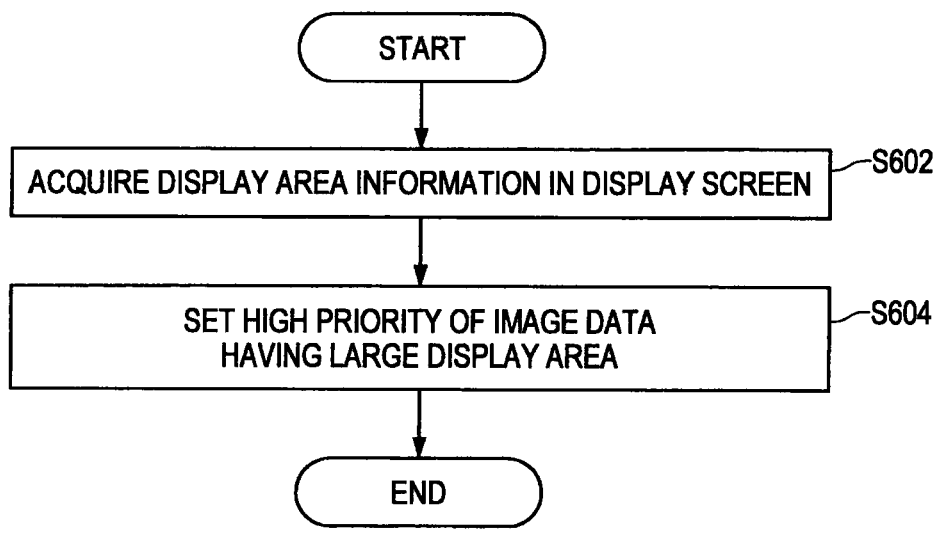

| IMAGE | PIXEL NUMBER (UNIT:PIXEL) | TIME REQUIRED FOR DECODING PROCESS (UNIT:SECOND) |
|---|---|---|
| #10 | 460,800 | 3.0 |
| #11 | 307,200 | 2.0 |
| #12 | 153,600 | 1.0 |
| #13 | 153,600 | 1.0 |
| #14 | 153,600 | 1.0 |
| #15 | 153,600 | 1.0 |

FIG.12

| IMAGE | TIME REQUIRED FOR DECODING PROCESS (UNIT:SECOND) | TOTAL ELAPSED TIME (UNIT:SECOND) |
|---|---|---|
| #10 | 3.0 | 3.0 |
| #11 | 2.0 | 5.0 |
| #12 | 1.0 | 6.0 |
| #13 | 1.0 | 7.0 |
| #14 | 1.0 | 8.0 |
| #15 | 1.0 | 9.0 |

FIG.13

| IMAGE | TIME REQUIRED FOR DECODING PROCESS (UNIT:SECOND) | TOTAL ELAPSED TIME (UNIT:SECOND) |
|---|---|---|
| #12 | 1.0 | 1.0 |
| #13 | 1.0 | 2.0 |
| #14 | 1.0 | 3.0 |
| #15 | 1.0 | 4.0 |
| #11 | 2.0 | 6.0 |
| #10 | 3.0 | 9.0 |

IMAGE DATA PROCESSING DEVICE, IMAGE DATA PROCESSING METHOD, AND PROGRAM

BACKGROUND OF THE INVENTION

1. Field of the Invention

The present invention relates to an image data processing device, an image data processing method, and a program.

2. Description of the Related Art

There are many opportunities to display a number of images on a display device, such as a display. When a number of images are displayed on the display device, an image desired to be displayed may not appear on a display screen of the display device. In this case, image data of an image located outside the display screen is preferably decoded in advance so that the image can be directly displayed when entering the display screen, for example, due to a user manipulation.

For example, in technology for decoding image data in advance, as disclosed in Japanese Patent Laid-open Publication No. 2009-109880, image data to be decoded is determined based on a direction of a manipulation by a user.

SUMMARY OF THE INVENTION

However, in the technology disclosed in Japanese Patent Laid-open Publication No. 2009-109880 as described above, manipulation information for only one manipulation performed directly before by a user is used as manipulation information for determining image data to be decoded, and the manipulation information is insufficient as information for properly performing a process of predicting image data to be decoded.

Further, in a typical device, an available memory has an upper limit in the order of bytes, making it difficult to permanently hold decoded image data in the memory. Accordingly, the decoded image data needs to be discarded before a used byte number of the memory reaches a limit value. However, in the technology disclosed in Japanese Patent Laid-open Publication No. 2009-109880 as described above, a determination is not made as to image data to be preferentially discarded when the image data is discarded, causing image data that should not be discarded to be first discarded.

In light of the foregoing, it is desirable to provide an image data processing device, an image data processing method and a program which are novel and improved and which are capable of preparing decoded image data necessary to shorten a waiting time of a user when an image is displayed.

According to an embodiment of the present invention, there is provided an image data processing device including a display control unit for controlling display of an image on a display device, a decoding priority setting unit for setting a decoding priority in each of image data of a plurality of images that may be displayed on a display screen of the display device by the display control unit, a decoding unit for performing a decoding process on each image data according to the decoding priority set by the decoding priority setting unit, and a storage unit for storing each decoded image data subjected to the decoding process by the decoding unit.

The decoding priority setting unit may acquire position information of each of the image data of the plurality of images, and sets a decoding priority in each of the image data of the plurality of images based on the acquired position information.

The decoding priority setting unit may acquire number-of-pixel information of each of the image data of the plurality of images, and sets a decoding priority in each of image data of the plurality of images based on the acquired number-of-pixel information.

The decoding priority setting unit may acquire history information of user manipulations, and sets a decoding priority in each of the image data of the plurality of images based on the acquired manipulation history information.

The decoding priority setting unit may acquire meta information of each of the image data of the plurality of images, and sets a decoding priority in each of the image data of the plurality of images based on a display priority included in the acquired meta information. The decoding priority setting unit may use information contained in the image data or information acquired from the exterior as the meta information.

The decoding priority setting unit may acquire information on a display area in the display screen of each of the image data of the plurality of images, and sets a decoding priority in each of the image data of a plurality of images based on the acquired display area information.

The image data processing device may further including a discard priority setting unit for setting a discard priority in each of decoded image data stored in the storage unit; and discarding unit for discarding the decoded image data stored in the storage unit according to the discard priority set by the discard priority setting unit.

According to another embodiment of the present invention, there is provided an image data processing device including a display control unit for controlling display of an image on a display device, a decoding unit for performing a decoding process on each of image data of a plurality of images that may be displayed on a display screen of the display device by the display control unit, a storage unit for storing each decoded image data subjected to the decoding process by the decoding unit, a discard priority setting unit for setting a discard priority in each decoded image data stored in the storage unit, and a discarding unit for discarding the decoded image data stored in the storage unit according to the discard priority set by the discard priority setting unit.

The discard priority setting unit may acquire position information of each of the decoded image data stored in the storage unit, and sets a discard priority in each decoded image data stored in the storage unit based on the acquired position information.

The discard priority setting unit may acquire number-of-pixel information of each of the decoded image data stored in the storage unit, and sets a discard priority in each decoded image data stored in the storage unit based on the acquired number-of-pixel information.

The discard priority setting unit may acquire history information of user manipulations, and sets a discard priority in each decoded image data stored in the storage unit based on the acquired manipulation history information.

The discard priority setting unit may acquire meta information of each of the decoded image data stored in the storage unit, and sets a discard priority in each decoded image data stored in the storage unit based on a display priority included in the acquired meta information. The decoding priority setting unit may use information contained in the image data or information acquired from the exterior as the meta information.

The discard priority setting unit may acquire information on a display area in the display screen of each of the decoded image data stored in the storage unit, and sets a discard priority in each decoded image data stored in the storage unit based on the acquired display area information.

The image data processing device may further including a decoding priority setting unit for setting a decoding priority in each of image data of a plurality of images that may be displayed on a display screen of the display device by the display control unit. And the decoding unit may perform a decoding process on each of the image data according to the decoding priority set by the decoding priority setting unit.

According to another embodiment of the present invention, there is provided an image data processing method including the steps of controlling display of an image on a display device, setting a decoding priority in each of image data of a plurality of images that may be displayed on a display screen of the display device in the display control step, performing a decoding process on each image data according to the decoding priority set in the decoding priority setting step, and storing, in a storage unit, each decoded image data subjected to the decoding process in the decoding step.

According to another embodiment of the present invention, there is provided an image data processing method including the steps of controlling display of an image on a display device, performing a decoding process on each of image data of a plurality of images that may be displayed on a display screen of the display device in the display control step, storing, in a storage unit, each decoded image data subjected to the decoding process in the decoding step, setting a discard priority in each decoded image data stored in the storage unit in the storing step, and discarding the decoded image data stored in the storage unit according to the discard priority set in the discard priority setting step.

According to another embodiment of the present invention, there is provided a program for causing a computer to function as a display control unit for controlling display of an image on a display device, a decoding priority setting unit for setting a decoding priority in each of image data of a plurality of images that may be displayed on a display screen of the display device by the display control unit, a decoding unit for performing a decoding process on each image data according to the decoding priority set by the decoding priority setting unit, and a storage unit for storing each decoded image data subjected to the decoding process by the decoding unit.

According to another embodiment of the present invention, there is provided a program for causing a computer to function as a display control unit for controlling display of an image on a display device, a decoding unit for performing a decoding process on each of image data of a plurality of images that may be displayed on a display screen of the display device by the display control unit, a storage unit for storing each decoded image data subjected to the decoding process by the decoding unit, a discard priority setting unit for setting a discard priority in each decoded image data stored in the storage unit, and a discarding unit for discarding the decoded image data stored in the storage unit according to the discard priority set by the discard priority setting unit.

According to the present invention as described above, it is possible to prepare decoded image data necessary to shorten a waiting time of a user when an image is displayed.

BRIEF DESCRIPTION OF THE DRAWINGS

FIG. 7 is a flowchart of a fourth decoding priority setting process executed in step S104 in the image data decoding process of FIG. 3;

FIG. 8 is a flowchart of a fifth decoding priority setting process executed in step S104 in the image data decoding process of FIG. 3;

FIG. 12 is an illustrative diagram illustrating an image displayed on a display screen;

FIG. 13 is an illustrative diagram illustrating an image displayed on a display screen;

DETAILED DESCRIPTION OF THE EMBODIMENT(S)

Figure 1:
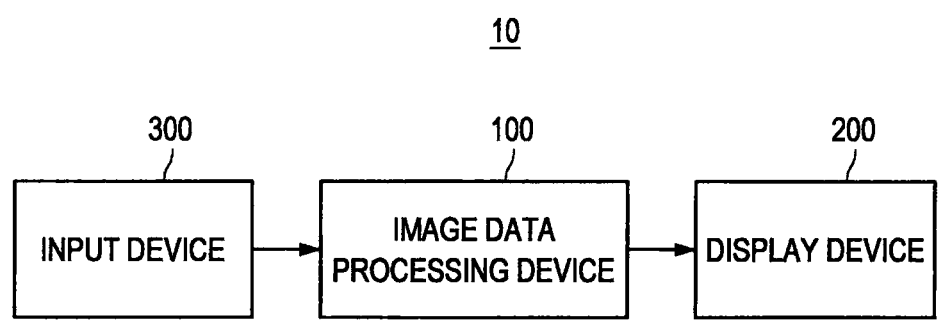
FIG. 1 is a block diagram schematically showing a configuration of an image data display system including an image data processing device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, a description will be given in the following order.

1. Image Data Processing Device according to Embodiment of the Present Invention 2. Image Data Decoding Process Executed by Image Data Processing Device according to Embodiment of the Present Invention 3. Image Data Discarding Process Executed by Image Data Processing Device according to Embodiment of the Present Invention

[1. Image Data Processing Device]

First, an image data display system including an image data processing device according to an embodiment of the present invention will be described. FIG. 1 is a block diagram schematically showing a configuration of an image data display system including an image data processing device according to the present embodiment.

In FIG. 1, the image data display system 10 includes an image data processing device 100, a display device 200, and an input device 300. The image data processing device 100 is connected to the display device 200 such as a display, for example, via a cable. If the image data processing device 100 is capable of wirelessly transmitting image data to the external display device 200, it is unnecessary to connect the image data processing device 100 and the display device 200, for example, using a cable. A user causes the image data processing device 100 to execute various processes by manipulating the input device 300. Further, the image data processing device 100, the display device 200 and the input device 300 may be included in the same casing.

The image data processing device 100 displays an image on the display device 200 based on image data acquired from the exterior or recorded therein.

The input device 300 may be a mouse or a keyboard connected to the image data processing device 100 or may be a touch panel. Further, the input device 300 may be a cross key or a trackball.

Figure 2:
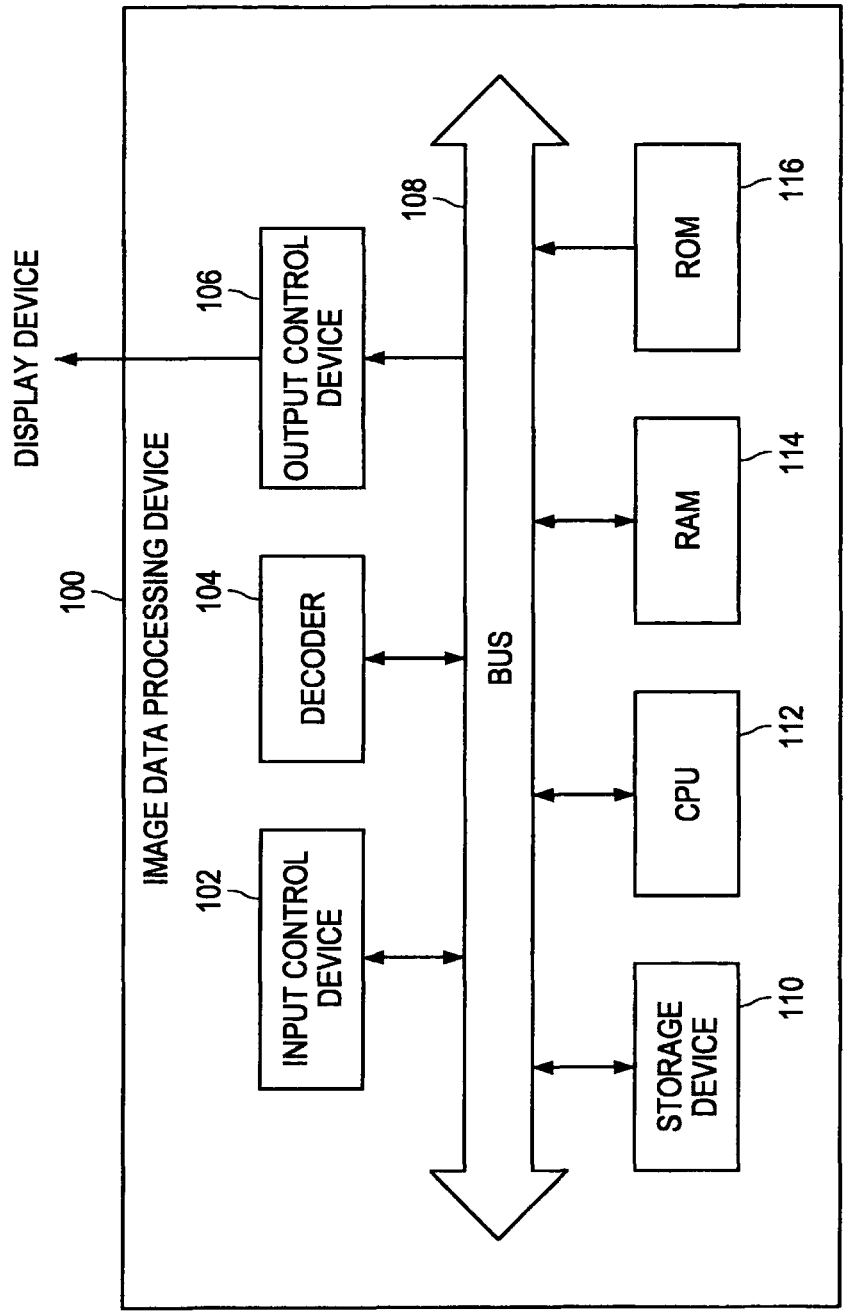
FIG. 2 is a block diagram schematically showing a hardware configuration of the image data processing device in FIG. 1.

Next, a hardware configuration of the image data processing device 100 in FIG. 1 will be described. FIG. 2 is a block diagram schematically showing the hardware configuration of the image data processing device 100 in FIG. 1.

In FIG. 2, the image data processing device 100 includes an input control device 102, a decoder 104, an output control device 106, a bus 108, a storage device 110, a CPU 112, a RAM 114, and a ROM 116. Each unit is connected via the bus 108. The RAM 114 is one example of a storage unit of an embodiment of the present invention.

The input control device 102 receives a signal from the input device 300 and detects a user manipulation. The input control device 102 outputs information indicating content of the user manipulation to the CPU 112 via the bus 108.

The decoder 104 is one example of a decoding unit of an embodiment of the present invention, and reads image data, for example, from the storage device 110 via the bus 108 and deploys the image data in the RAM 114 under control of the CPU 112. The decoder 104 decodes the image data deployed in the RAM 114, and stores the decoded image data in the RAM 114. The RAM 114 is a memory having a capacity capable of storing decoded image data of a plurality of images. While the image data processing device 100 includes the decoder 104 in the present embodiment, the decoder 104 is unnecessary if the CPU 112 itself has a function of the decoder. In this case, the CPU 112 performs image data decoding using software.

The output control device 106 is one example of a display control unit of an embodiment of the present invention and, under control of the CPU 112, reads the decoded image data from the RAM 114 and displays the image on the display device 200 based on the read image data.

The storage device 110 includes a hard disk or a flash memory, and stores image data received from a device such as a personal computer via an interface (not shown). Further, the image data processing device 100 may acquire the image data from a device such as a web server (not shown) on the Internet (not shown).

The CPU 112 performs, for example, a read-ahead process by loading a program stored in the ROM 116 or the storage device 110 to the RAM 114 and executing the program to control an entire operation of the image data processing device 100. Further, the "read-ahead" refers to preparing decoded image data used for displaying in advance by reading image data of an image different from an image actually displayed on the display device 200 from the storage device 110, deploying the image data in an empty area of the memory, and properly performing a process such as a decoding process. Further, the image data processing device 100 may perform, for example, an image data decoding process using the CPU 112 instead of the decoder 104. Further, the CPU 112 is one example of a decoding priority setting unit, a discard priority setting unit, or a discarding unit of an embodiment of the present invention.

Figure 9:
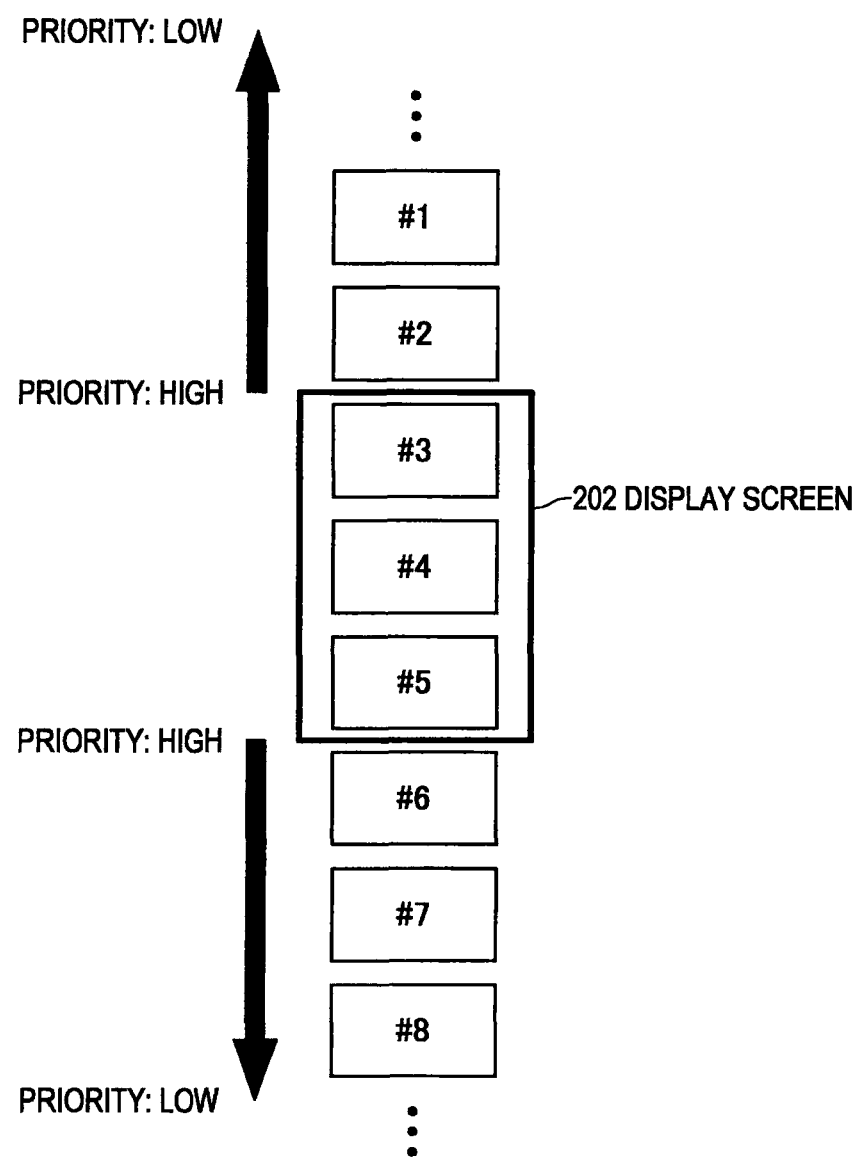
FIG. 9 is an illustrative diagram illustrating an image displayed on a display screen.

Meanwhile, when a number of images are displayed on the display device 200, images desired to be displayed may not often be located inside the display screen 202 of the display device 200 (see FIG. 9). In this case, image data of an image located outside the display screen 202 is preferably decoded in advance so that the image can be directly displayed when entering the display screen 202, for example, due to a user manipulation.

In the typical image data processing device 100, an available memory has an upper limit in the order of bytes, making it difficult to permanently hold decoded image data in the memory. Accordingly, the decoded image data needs to be discarded before a used byte number of the memory reaches a limit value. However, image data that should not be discarded may be first discarded if image data to be preferentially discarded is not determined when the image data is discarded.

The image data processing device according to the present embodiment can decode image data of an image located outside the display screen 202 in advance by executing an image data decoding process of FIG. 3, which will be described below. Further, the image data processing device according to the present embodiment can prevent image data that should not be discarded from being first discarded, by executing an image data discarding process of FIG. 16, which will be described below. Thus, according to the present embodiment, it is possible to prepare decoded image data necessary to shorten a user waiting time when the image data is displayed.

[2. Image Data Decoding Process Executed by Image Data Processing Device]

Next, an image data decoding process executed in the image data processing device 100 of FIG. 2 will be described. FIG. 3 is a flowchart of an image data decoding process executed by the image data processing device 100 of FIG. 2. This process is a process for shortening a waiting time of a user for rendering an image as much as possible when a plurality of encoded image data is displayed on the display screen 202 of the display device 200.

Figure 3:
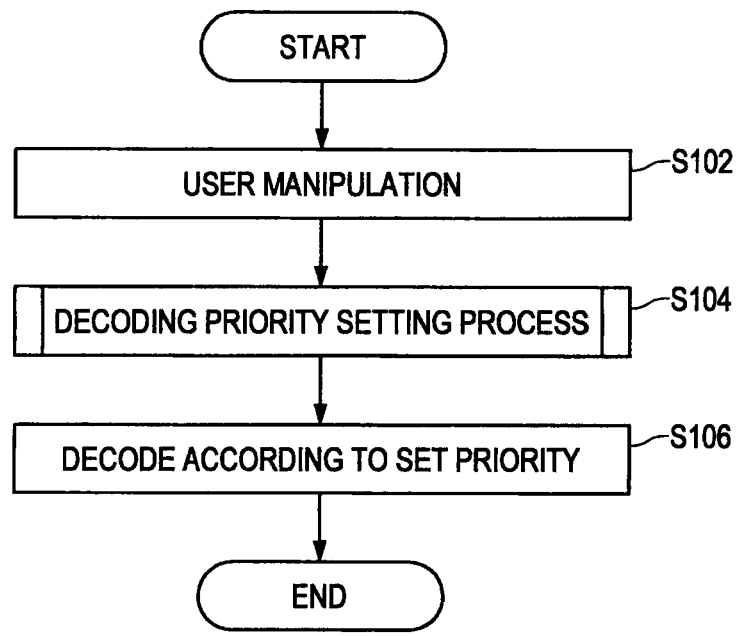
FIG. 3 is a flowchart of an image data decoding process executed by the image data processing device of FIG. 2.

In FIG. 3, first, when a manipulation is input by a user via the input device 300, the input control device 102 of the image data processing device 100 receives a signal from the input device 300 to detect the user manipulation. The input control device 102 outputs information indicating content of the user manipulation to the CPU 112 of the image data processing device 100 (step S102).

The CPU 112 of the image data processing device 100 then executes at least one of a first decoding priority setting process in FIG. 4, a second decoding priority setting process in FIG. 5, a third decoding priority setting process in FIG. 6, a fourth decoding priority setting process in FIG. 7, and a fifth decoding priority setting process in FIG. 8, which will be described below, to set a decoding priority of each of image data of all images desired to be displayed on the display device 200 based on the information indicating content of the user manipulation input from the input control device 102 (step S104).

Next, under control of the CPU 112, the decoder 104 of the image data processing device 100 decodes each image data according to the decoding priority set for each of the image data of all images desired to be displayed on the display device 200, stores the decoded image data in the RAM 114 (step S106), and terminates this process.

Figure 4:
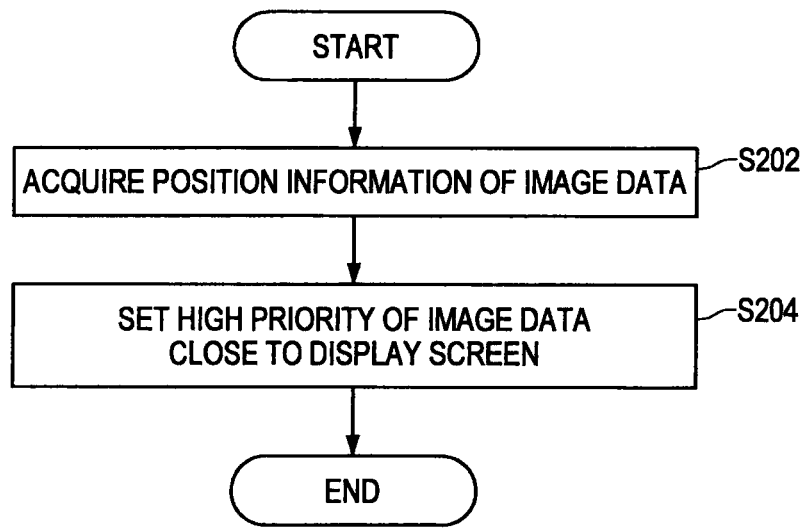
FIG. 4 is a flowchart of a first decoding priority setting process executed in step S104 in the image data decoding process of FIG. 3.

FIG. 4 is a flowchart of the first decoding priority setting process executed in step S104 in the image data decoding process of FIG. 3.

In FIG. 4, the CPU 112 of the image data processing device 100 acquires position information of each of the image data of all images desired to be displayed on the display device 200 (step S202).

The CPU 112 then sets a high decoding priority of image data close to the display screen 202 based on the position information acquired in step S202 (step S204), and terminates this process.

For example, when images #1 to #8 are desired to be displayed on the display screen 202 as shown in FIG. 9, it is necessary to decode image data of the images #3 to #5 present in an area of the display screen 202 and display the images on the display screen 202 as soon as possible, so that the images #3 to #5 are viewed by a user. Accordingly, the highest decoding priority of the image data of the images is set. Further, for the images #1, #2 and #6 to #8 present in areas other than the area of the display screen 202, an image close to the display screen 202 is highly likely to enter the area of the display screen 202 due to a user manipulation such as a future scroll. Accordingly, a decoding priority of decoded image data of an image close to the display screen 202 is set to be higher than that of image data of an image away from the display screen 202.

Figure 5:
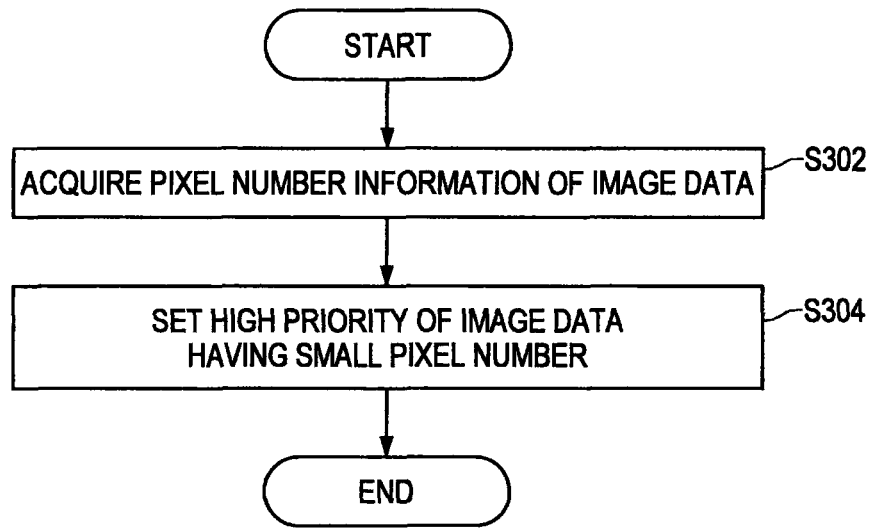
FIG. 5 is a flowchart of a second decoding priority setting process executed in step S104 in the image data decoding process of FIG. 3.

FIG. 5 is a flowchart of the second decoding priority setting process executed in step S104 in the image data decoding process of FIG. 3.

In FIG. 5, the CPU 112 of the image data processing device 100 acquires number-of-pixel information of each of image data of all images desired to be displayed on the display device 200 (step S302).

The CPU 112 then puts a high decoding priority on image data with smaller number of pixels based on the number-of-pixel information acquired in step S302 (step S304), and terminates this process.

Figures 10, 11:
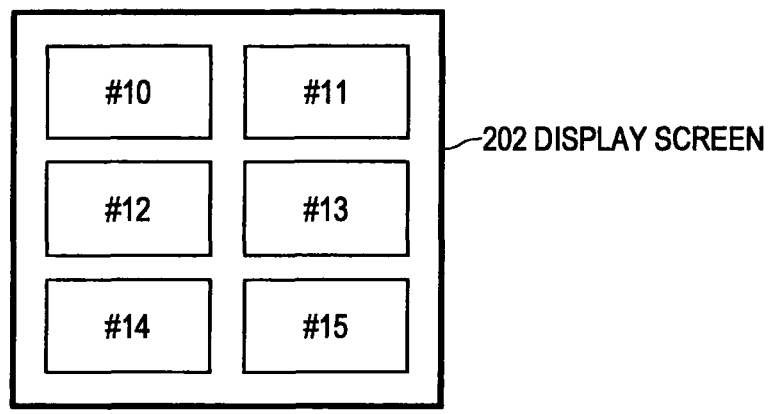
FIG. 10 is an illustrative diagram illustrating an image displayed on a display screen.
FIG. 11 is an illustrative diagram illustrating an image displayed on a display screen.

For example, when images #10 to #15 as shown in FIG. 10 are displayed in a display screen 202 as shown in FIG. 11 and image data of the images #10 to #15 are decoded in an order shown in FIG. 12, a total elapsed time taken to decode all the image data is 9 seconds. Only the image data of the image #10 has been decoded at a timing when 4 seconds has elapsed after decoding starts. Meanwhile, when the image data of the images #10 to #15 are decoded in an order shown in FIG. 13, a total elapsed time taken to decode all the image data is 9 seconds as in the case in which the image data is decoded in the order shown in FIG. 12, but four image data of the images #12 to #15 have been decoded at the timing when 4 seconds has elapsed after decoding starts. In general, image data with smaller number of pixels requires a shorter processing time to decode than image data with larger number of pixels. Accordingly, since decoding of a number of image data is completed in an earlier stage by preferentially performing decoding of the image data with smaller number of pixels, a number of images are rapidly displayed on the display screen 202, thereby shortening a psychological waiting time of the user. Thus, in the present embodiment, a higher decoding priority is set for the image data with smaller number of pixels.

Figure 6:
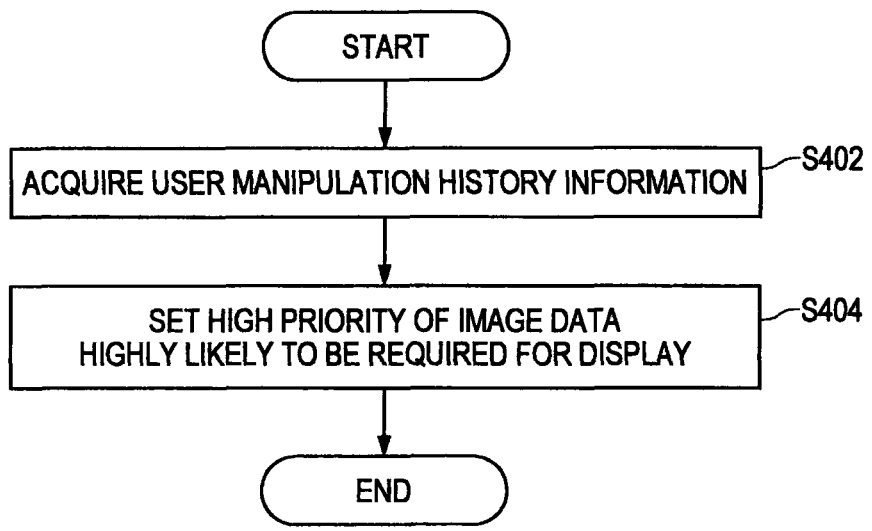
FIG. 6 is a flowchart of a third decoding priority setting process executed in step S104 in the image data decoding process of FIG. 3.

FIG. 6 is a flowchart of the third decoding priority setting process executed in step S104 in the image data decoding process of FIG. 3.

In FIG. 6, the CPU 112 of the image data processing device 100 acquires history information of user manipulations (step S402).

The CPU 112 then sets a high decoding priority for image data of an image highly likely to be required to be displayed among all images desired to be displayed on the display device 200 based on the user manipulation history information acquired in step S402 (step S404), and terminates this process.

Figure 14:
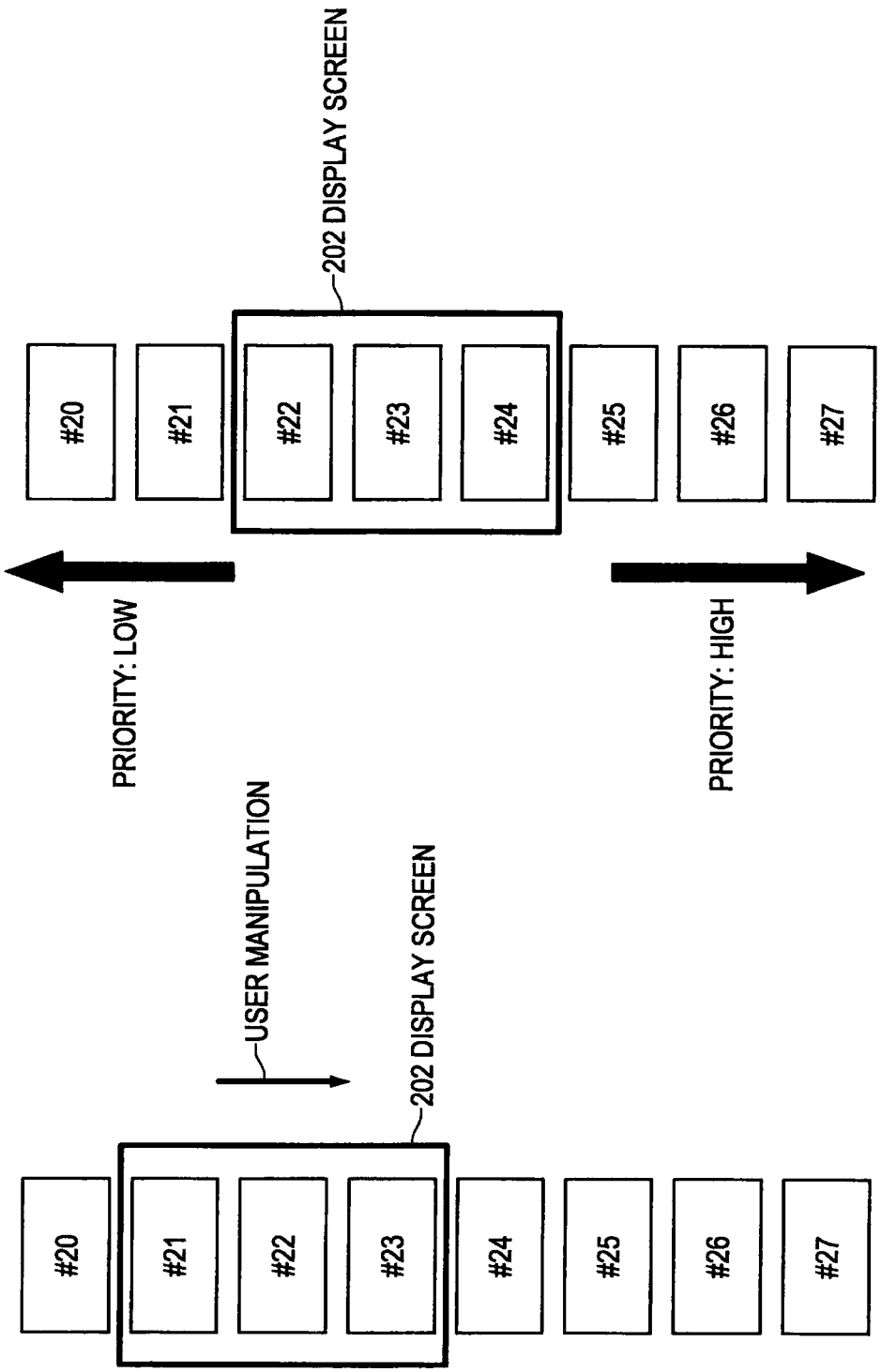
FIGS. 14(A) and (B) are illustrative diagrams illustrating an image displayed on a display screen.

For example, when the user performs a scroll manipulation downward as shown in FIG. 14(A) or the user continuously performs the scroll manipulation downward for a state shown in FIG. 14(B), a scroll manipulation by a next user is highly likely to be performed downward. Accordingly, a decoding priority of image data of an image in a down direction from the display screen 202 among images difficult to be displayed on the display screen 202 is set to be higher than that of image data of the image in an up direction. That is, in the present embodiment, an image that is highly likely to be required to be displayed next is predicted based on the history information for manipulations performed by the user, and a high decoding priority is set for the image data of the image.

Further, the manipulation history information used in the present embodiment may be manipulation history information in a currently executed application, as well as history information for a user manipulation performed upon execution of another application.

Further, in the present embodiment, manipulation history information of another user may be acquired, for example, using the Internet (not shown) and used. For example, a manipulation performed by the user may have a tendency depending on displayed content. When a user views a webpage including a plurality of advertisement images, on a web browser, many users who do not want to view advertisements are expected to directly relegate the advertisement to the outside of the display screen, for example, by a scroll manipulation. Such a user manipulation tendency is held, as shared knowledge, in a web server on the Internet, and this information is used via the Internet, thus enabling more accurate prediction to be performed.

FIG. 7 is a flowchart of the fourth decoding priority setting process executed in step S104 in the image data decoding process of FIG. 3.

In FIG. 7, the CPU 112 of the image data processing device 100 acquires meta information of each of image data of all images desired to be displayed on the display device 200 (step S502).

The CPU 112 sets a high decoding priority for the image data of an image having a high display priority based on a display priority included in the meta information acquired in step S502 (step S504), and terminates this process.

Figure 15:
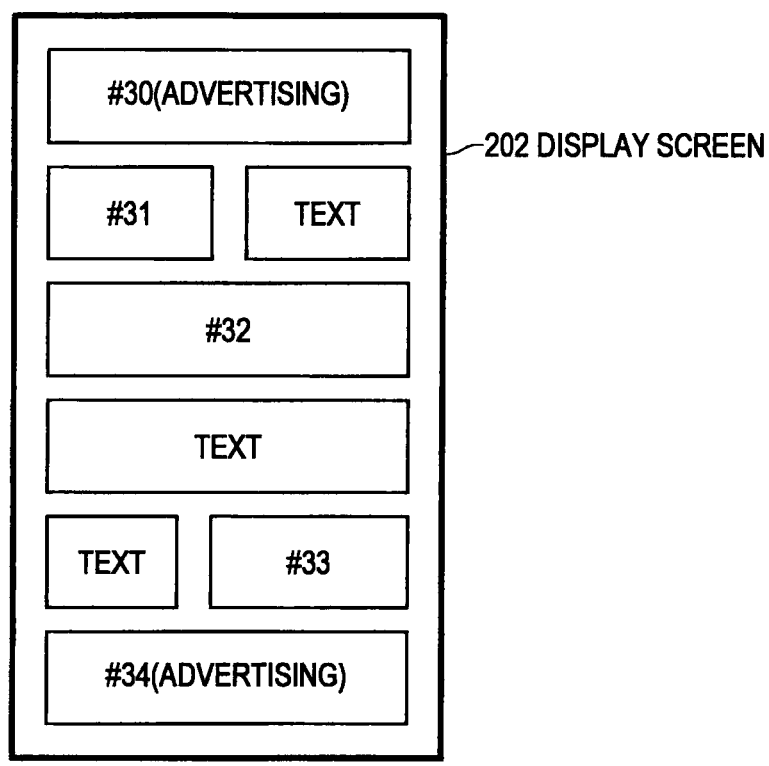
FIG. 15 is an illustrative diagram illustrating an image displayed on a display screen.

For example, when a webpage as shown in FIG. 15 is displayed on the display screen 202, the user is considered to desire to view images #31 to #33 other than images #30 and #34, which are advertisements. Therefore, information for lowering the display priority is added to meta information of image data of the images #30 and #34, which are advertisements. Accordingly, since image data of the images #31 to #33 considered to be desired to be viewed by the user is preferentially decoded, the images desired to be viewed by the user are rapidly displayed on the display screen 202, thereby shortening a psychological waiting time of the user. Thus, in the present embodiment, a high decoding priority is set for image data having a high display priority.

FIG. 8 is a flowchart of the fifth decoding priority setting process executed in step S104 in the image data decoding process of FIG. 3.

In FIG. 8, the CPU 112 of the image data processing device 100 acquires information on a display area in the display screen 202 of each of image data of all images desired to be displayed on the display device 200 (step S602).

The CPU 112 then sets a high decoding priority for image data of an image having a large display area based on the display area information acquired in step S602 (step S604), and terminates this process.

For example, when the webpage as shown in FIG. 15 is displayed on the display screen 202 and the number of pixels of image data of images #31 to #33 are substantially the same, times taken to decode image data of the images #31 to #33 are substantially the same. Accordingly, a decoding priority of the image data of the image #32 having a large display area is set to be higher than those of the image data of the image #31 and the image #33. Thus, since image data of an image having a large display area is preferentially decoded, the image having a large display area in the webpage is rapidly displayed on the display screen 202, thereby shortening a psychological waiting time of the user.

According to the image data decoding process of FIG. 3 as described above, it is possible to prepare decoded image data necessary to shorten a user waiting time when an image is displayed.

[3. Image Data Discarding Process Executed by Image Data Processing Device]

Figure 16:
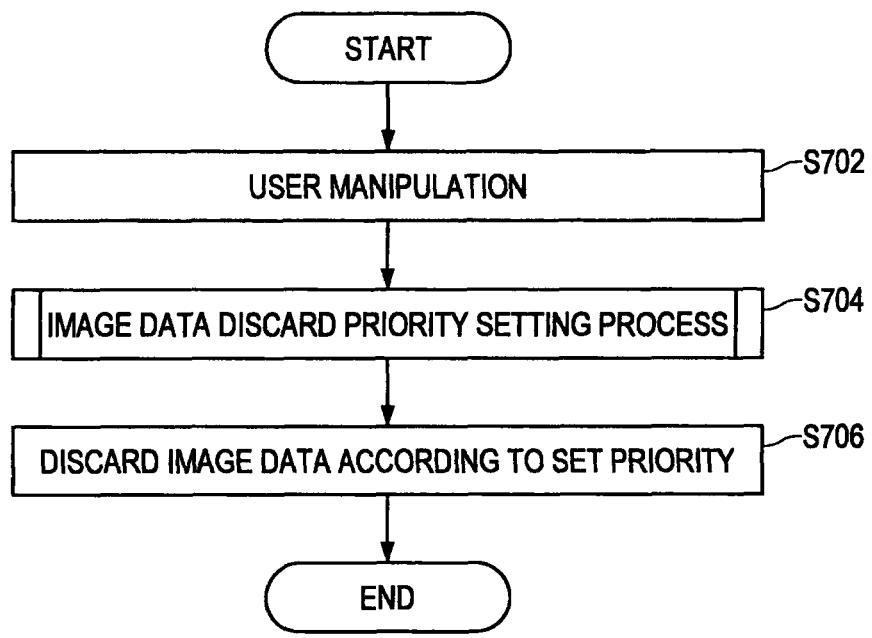
FIG. 16 is a flowchart of an image data discarding process executed by the image data processing device 100 of FIG. 2.

Next, an image data discarding process executed by the image data processing device 100 of FIG. 2 will be described. FIG. 16 is a flowchart of an image data discarding process executed by the image data processing device 100 of FIG. 2. This process is a process of shortening a waiting time of a user for rendering images as much as possible when a plurality of encoded image data is displayed in the display screen 202 of the display device 200.

Further, in the image data processing device 100, decoded image data is not discarded even after rendering is completed in the display screen 202 of the display device 200, but stored in the RAM 114 as a memory, so that the image data is not decoded again. The decoded image data is used to render the image again, thereby rapidly displaying the image. However, in the typical image data processing device 100, an available memory has an upper limit in the order of bytes, making it difficult to permanently hold the decoded image data on the memory, as described above. This process is a process of determining image data to be preferentially discarded when the image data is discarded.

In FIG. 16, first, when a manipulation is input by a user via the input device 300, the input control device 102 of the image data processing device 100 receives a signal from the input device 300 to detect the manipulation of the user. The input control device 102 outputs information indicating content of the user manipulation to the CPU 112 of the image data processing device 100 (step S702).

The CPU 112 of the image data processing device 100 then executes at least one of a first discard priority setting process in FIG. 17, a second discard priority setting process in FIG. 18, a third discard priority setting process in FIG. 19, a fourth discard priority setting process in FIG. 20, and a fifth discard priority setting process in FIG. 21, which will be described below, to set a discard priority of each decoded image data used for displaying, which is stored in the RAM 114 as a memory of the image data processing device 100, based on the information indicating content of the user manipulation input from the input control device 102 (step S704).

The CPU 112 of the image data processing device 100 then discards the decoded image data from the RAM 114 according to the discard priority set for each decoded image data used for displaying (step S706), and terminates this process.

Figure 17:
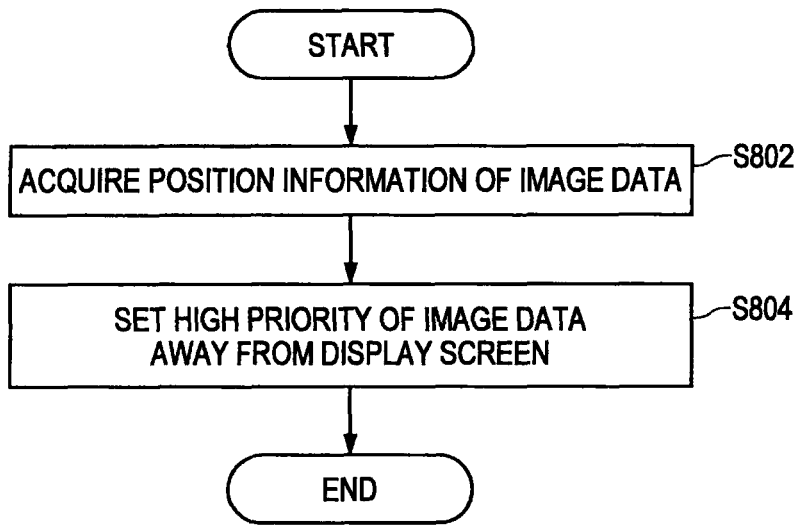
FIG. 17 is a flowchart of a first discard priority setting process executed in step S704 in the image data discarding process of FIG. 16.

FIG. 17 is a flowchart of the first discard priority setting process executed in step S704 in the image data discarding process of FIG. 16.

In FIG. 17, the CPU 112 of the image data processing device 100 acquires position information of each of decoded image data used for displaying, which is stored in the RAM 114 as a memory (step S802).

The CPU 112 then sets a high discard priority for image data away from the display screen 202 based on the position information acquired in step S802 (step S804), and terminates this process.

For example, when decoded image data of images #1, #2 and #6 to #8 present in areas other than the area of the display screen 202 as shown in FIG. 9 is stored in the RAM 114 as a memory, an image close to the display screen 202 is highly likely to enter the area of the display screen 202 due to a user manipulation such as future scroll. Thus, a discard priority of decoded image data of an image away from the display screen 202 is set to be higher than that of image data of the image close to the display screen 202.

Figure 18:
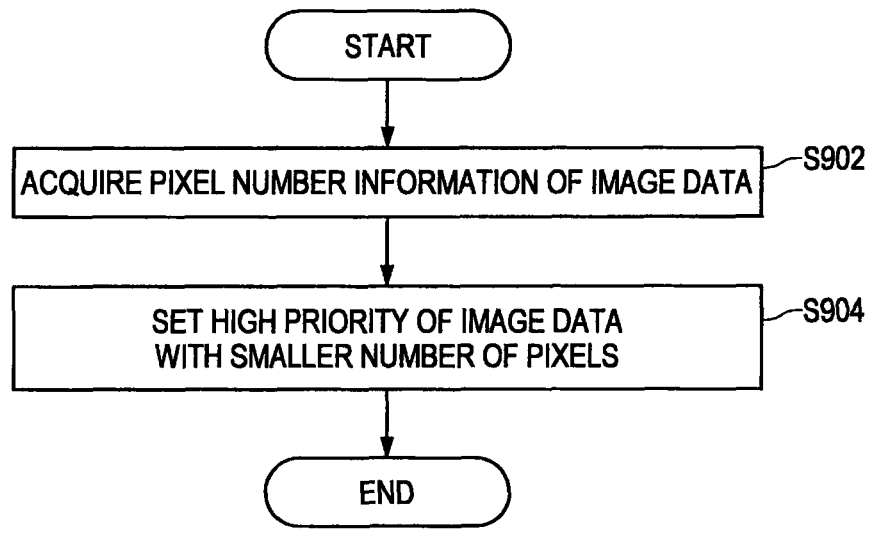
FIG. 18 is a flowchart of a second discard priority setting process executed in step S704 in the image data discarding process of FIG. 16.

FIG. 18 is a flowchart of the second discard priority setting process executed in step S704 in the image data discarding process of FIG. 16.

In FIG. 18, the CPU 112 of the image data processing device 100 acquires number-of-pixel information of each of the decoded image data used for displaying, which is stored in the RAM 114 as a memory (step S902).

The CPU 112 then sets a high discard priority for image data with smaller number of pixels based on the number-of-pixel information acquired in step S902 (step S904), and terminates this process.

For example, when decoded image data of images #10 to #15 as shown in FIG. 10 is stored in the RAM 114 as a memory, a time taken to decode image data with larger number of pixels is longer than a time taken to decode image data with smaller number of pixels, and accordingly, a high discard priority is set for the image data with smaller number of pixels.

Figure 19:
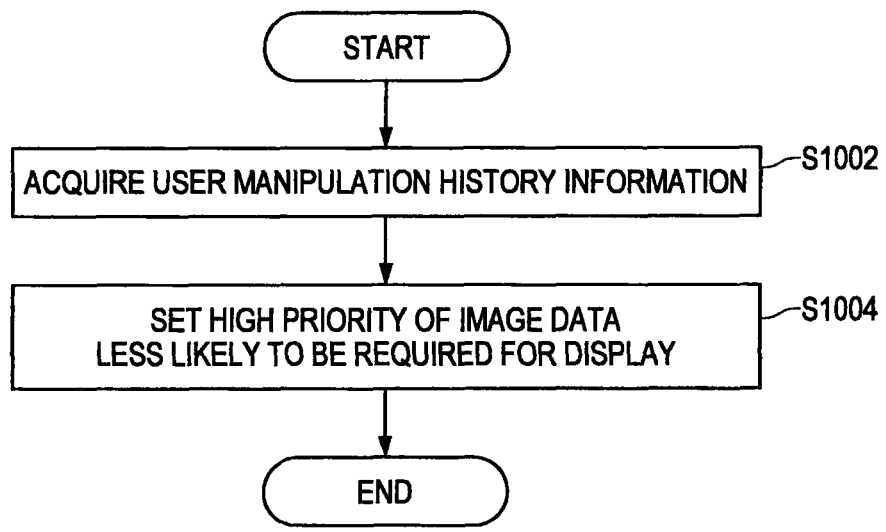
FIG. 19 is a flowchart of a third discard priority setting process executed in step S704 in the image data discarding process of FIG. 16.

FIG. 19 is a flowchart of the third discard priority setting process executed in step S704 in the image data discarding process of FIG. 16.

In FIG. 19, the CPU 112 of the image data processing device 100 acquires history information of user manipulations (step S1002).

The CPU 112 then sets a high discard priority for image data of an image that is less likely to be required to be displayed among the decoded image data used for displaying, which is stored in the RAM 114 as a memory based on the user manipulation history information acquired in step S1002 (step S1004), and terminates this process.

For example, when the user performs a scroll manipulation downward as shown in FIG. 14(A) or when the user continuously performs a scroll manipulation downward for the state shown in FIG. 14(B), a next scroll manipulation by a user is highly likely to be performed downward. Accordingly, a discard priority of decoded image data of an image in an up direction from the display screen 202 among images difficult to be displayed on the display screen 202 is set to be higher than that of decoded image data of an image in a down direction. That is, in the present embodiment, an image less likely to be required to be displayed next is predicted based on the information on a manipulation history performed by the user, and a high discard priority is set for decoded image data of the image.

Further, the manipulation history information used in the present embodiment may be manipulation history information in a currently executed application, as well as history information of user manipulations performed upon execution of another application.

Further, in the present embodiment, history information of manipulations of another user may be acquired, for example, using the Internet (not shown) and used. For example, a manipulation performed by the user has a tendency depending on displayed content. When the user views a webpage including a plurality of advertisement images, on a web browser, many users who do not want to view advertisements are expected to directly relegate the advertisement to the outside of the display screen, for example, by a scroll manipulation. Such a user manipulation tendency is held, as shared knowledge, in a web server on the Internet and this information is used via the Internet, thus enabling more accurate prediction to be performed.

Figure 20:
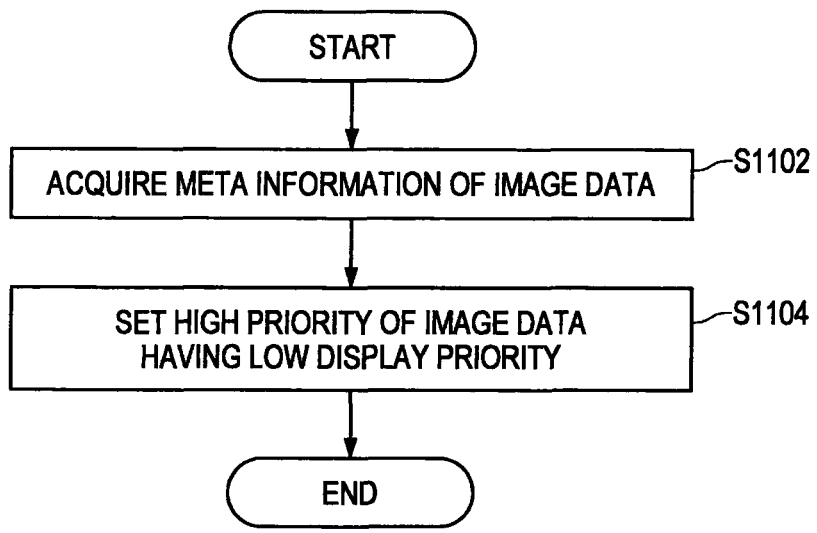
FIG. 20 is a flowchart of a fourth discard priority setting process executed in step S704 in the image data discarding process of FIG. 16.

FIG. 20 is a flowchart of the fourth discard priority setting process executed in step S704 in the image data discarding process of FIG. 16.

In FIG. 20, the CPU 112 of the image data processing device 100 acquires meta information of each of decoded image data used for displaying, which is stored in the RAM 114 as a memory (step S1102).

The CPU 112 then sets a high discard priority for image data of an image having a low display priority based on a display priority included in the meta information acquired in step S1102 (step S1104), and terminates this process.

For example, when the webpage as shown in FIG. 15 is displayed on the display screen 202, the user is considered to desire to view the images #31 to #33 rather than the images #30 and #34, which are advertisements. Accordingly, information for lowering the display priority is added to meta information of the image data of the images #30 and #34, which are advertisements. Accordingly, since the decoded image data of the images #30 and #34 other than the images #31 to #33 considered to be desired to be viewed by the user are first discarded, the images desired to be viewed by the user are rapidly displayed on the display screen 202, thereby shortening a psychological waiting time of the user. Thus, in the present embodiment, a high discard priority is set for an image having a low display priority data.

Figure 21:
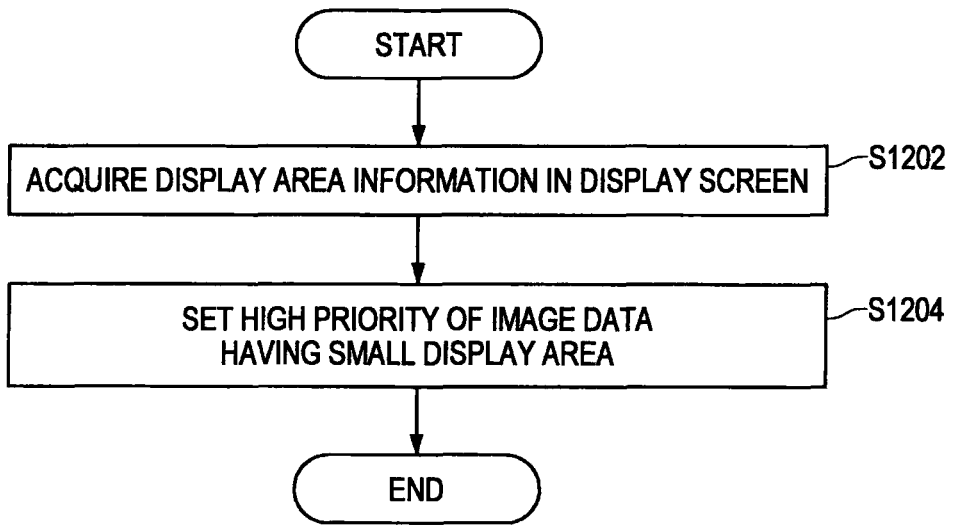
FIG. 21 is a flowchart of a fifth discard priority setting process executed in step S704 in the image data discarding process of FIG. 16.

FIG. 21 is a flowchart of the fifth discard priority setting process executed in step S704 in the image data discarding process of FIG. 16.

In FIG. 21, the CPU 112 of the image data processing device 100 acquires information on a display area in the display screen 202 of each of decoded image data used for displaying, which is stored in the RAM 114 as a memory (step S1202).

The CPU 112 then sets a high discard priority for image data of an image having a small display area based on the display area information acquired in step S1202 (step S1204), and terminates this process.

For example, when the webpage as shown in FIG. 15 is displayed on the display screen 202 and the number of pixels of the image data of the images #31 to #33 are substantially the same, times taken to decode the image data of the images #31 to #33 are substantially the same. Accordingly, a discard priority of the image data of the image #31 having a small display area is set to be higher than those of the image data of the images #32 and #33. Thus, an image having a large display area in the webpage is rapidly displayed on the display screen 202, thereby shortening a psychological waiting time of the user.

According to the image data discarding process of FIG. 16 as described above, it is possible to prepare decoded image data necessary to shorten a user waiting time when an image is displayed.

The set of processes described above may be executed by hardware or may be executed using software. When the set of processes are executed using software, a program constituting the software may execute various functions by installing a computer assembled in dedicated hardware, or various programs.

Figure 22:
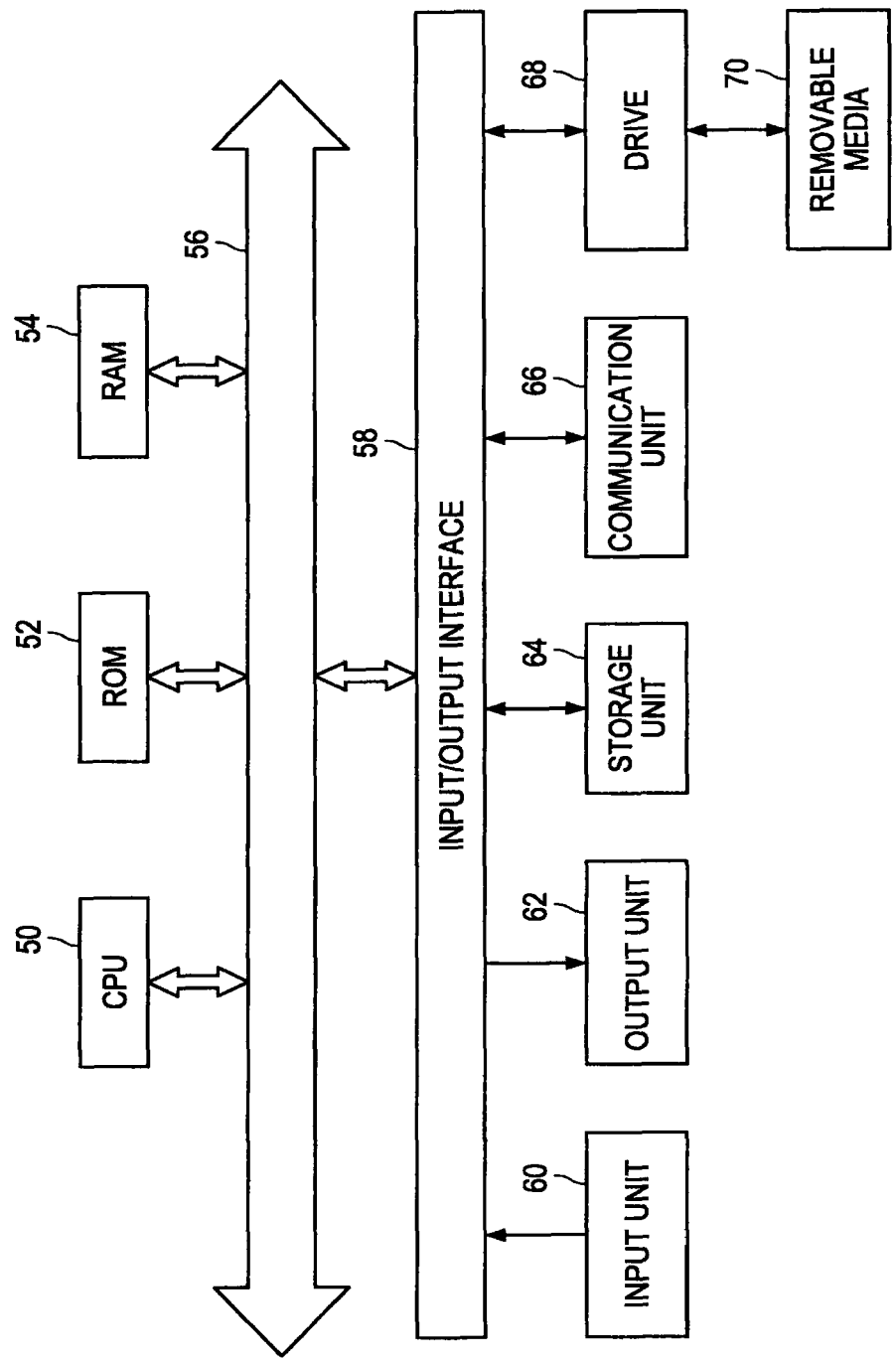
FIG. 22 is a block diagram schematically showing a hardware configuration of a computer that executes a set of processes described above using a program.

FIG. 22 is a block diagram schematically showing a hardware configuration of a computer that executes the set of processes described above using a program.

In FIG. 22, a CPU 50, a ROM 52, and a RAM 54 are connected to each other via a bus 56.

An input/output interface 58 is also connected to the bus 56. An input unit 60 including a keyboard, a mouse, a microphone or the like, an output unit 62 including a display, a speaker or the like, a storage unit 64 including a hard disk or a non-volatile memory, a communication unit 66 including a network interface, and a drive 68 for driving a removable medium 70, such as an optical disk or a semiconductor memory, are connected to the input/output interface 58.

In the computer configured as described above, the CPU 50 loads a program stored in, for example, the storage unit 64 to the RAM 54 via the input/output interface 58 and the bus 56 and executes the program to perform the set of processes described above.

The program executed by the CPU 50 is recorded, for example, in the removable medium 70 or provided via a wired or wireless transmission medium, such as a local area network, the Internet or digital broadcasting, and is installed in the storage unit 64.

Further, the program executed by the computer may be a program by which processes are sequentially performed in the order described in this disclosure or a program for performing a process at a necessary timing such as in parallel or when called.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-083854 filed in the Japan Patent Office on 31 Mar. 2010, the entire content of which is hereby incorporated by reference.

What is claimed is:

1. An image data processing device comprising:
   a display control unit for controlling display of images on a display device;
   a decoding priority setting unit for setting a decoding priority in each of image data of a plurality of images to be displayed on a display screen of the display device by the display control unit;
   a decoding unit for performing a decoding process on each image data according to the decoding priority set by the decoding priority setting unit; and a storage unit for storing each decoded image data subjected to the decoding process by the decoding unit, wherein the decoding unit performs, in advance, the decoding process on selected image data corresponding to selected ones of the plurality of images, in a processing order based on the set decoding priority, and prior to respective times at which each of the selected ones of the plurality of images is requested for display on the display screen, wherein the decoded selected image data is stored in the storage unit, and when respective ones of the selected ones of the plurality of images are requested for display on the display screen, corresponding decoded selected image data is retrieved from the storage unit, wherein when a user arbitrarily scrolls through the plurality of images being displayed on the display screen in a direction along which the plurality of images are arranged, the decoding unit performs advance decoding process on image data of images that are not currently displayed on the display screen according to the set decoding priority, the decoding priority having been set based on a predicted result of a future scroll manipulation of the plurality of images by the user and the decoding priority also indicating a likelihood that the images not currently displayed will be imminently requested for display, wherein the predicted result is indicative of which images not currently displayed will be displayed after performing of the future scroll manipulation of the plurality of images, wherein the plurality of images are not portions of any one single image, and wherein the plurality of images are displayed on the display screen as a list of sequentially arranged images.

2. The image data processing device according to claim 1, wherein the decoding priority setting unit acquires position information of each of the image data of the plurality of images, and sets a decoding priority in each of the image data of the plurality of images based on the acquired position information.

3. The image data processing device according to claim 1, wherein the decoding priority setting unit acquires number-of-pixel information of each of the image data of the plurality of images, and sets a decoding priority in each of image data of the plurality of images based on the acquired number-of-pixel information.

4. The image data processing device according to claim 1, wherein the decoding priority setting unit acquires history information of user manipulations, and sets a decoding priority in each of the image data of the plurality of images based on the acquired manipulation history information.

5. The image data processing device according to claim 1, wherein the decoding priority setting unit acquires meta information of each of the image data of the plurality of images, and sets a decoding priority in each of the image data of the plurality of images based on a display priority included in the acquired meta information.

6. The image data processing device according to claim 1, wherein the decoding priority setting unit acquires information on a display area in the display screen of each of the image data of the plurality of images, and sets a decoding priority in each of the image data of a plurality of images based on the acquired display area information.

7. The image data processing device according to claim 1, further comprising:

a discard priority setting unit for setting a discard priority in each of decoded image data stored in the storage unit; and a discarding unit for discarding the decoded image data stored in the storage unit according to the discard priority set by the discard priority setting unit.

8. The image data processing device according to claim 1, wherein the decoding unit performs, in advance, the decoding process on the selected image data so as to provide the decoded selected image data for direct display on the display screen after retrieval of the decoded selected image data from the storage unit.

9. The image data processing device according to claim 1, wherein the decoding unit performs the decoding process on the selected image data at a time prior to the corresponding selected ones of the plurality of images being actually displayed on the display screen.

10. The image data processing device according to claim 1, wherein the storage unit stores already-decoded selected image data for expediting display on the display screen of the corresponding selected ones of the plurality of images.

11. The image data processing device according to claim 10, wherein, upon a request for display, the selected ones of the plurality of images are displayed on the display screen based on corresponding decoded selected image data retrieved from the storage unit, without performing a further decoding in response to the request for display.

12. The image data processing device according to claim 10, wherein the stored already-decoded selected image data is retained in the storage unit until discarded according to a set discard priority process.

13. The image data processing device according to claim 12, wherein the set discard priority process is based on the likelihood that the images not currently displayed will be imminently requested for display.

14. The image data processing device according to claim 1, wherein the images that are not currently displayed on the display screen are arranged as part of the list of sequentially arranged images.

15. The image data processing device according to claim 1, wherein when the user scrolls through the plurality of images being displayed on the display screen, the images that are not currently displayed on the display screen are transitioned, by the scrolling, to be displayed on the screen performed by appearing as a continuation of the list of sequentially arranged images.

16. The image data processing device according to claim 1, wherein the images that are not currently displayed on the display screen are different than any of the plurality of images being displayed on the display screen.

17. An image data processing method comprising the steps of:

controlling display of images on a display device;

setting a decoding priority in each of image data of a plurality of images to be displayed on a display screen of the display device in the display control step;

performing a decoding process on each image data according to the decoding priority set in the decoding priority setting step; and storing, in a storage unit, each decoded image data subjected to the decoding process in the decoding step, wherein the decoding process is performed in advance on selected image data corresponding to selected ones of the plurality of images, in a processing order based on the set decoding priority, and prior to respective times at which each of the selected ones of the plurality of images is requested for display on the display screen, wherein the decoded selected image data is stored in the storage unit, and when respective ones of the selected ones of the plurality of images are requested for display on the display screen, corresponding decoded selected image data is retrieved from the storage unit, wherein when a user arbitrarily scrolls through the plurality of images being displayed on the display screen in a direction along which the plurality of images are arranged, advance decoding process is performed on image data of images that are not currently displayed on the display screen according to the set decoding priority, the decoding priority having been set based on a predicted result of a future scroll manipulation of the plurality of images by the user and the decoding priority also indicating a likelihood that the images not currently displayed will be imminently requested for display, wherein the predicted result is indicative of which images not currently displayed will be displayed after performing of the future scroll manipulation of the plurality of images, wherein the plurality of images are not portions of any one single image, and wherein the plurality of images are displayed on the display screen as a list of sequentially arranged images.

18. A non-transitory computer-readable medium having embodied thereon a program, which when executed by a computer, causes the computer to perform an image data processing method, the method comprising the steps of:

controlling display of images on a display device;

setting a decoding priority in each of image data of a plurality of images to be displayed on a display screen of the display device in the display control step;

performing a decoding process on each image data according to the decoding priority set in the decoding priority setting step; and storing, in a storage unit, each decoded image data subjected to the decoding process in the decoding step, wherein the decoding process is performed in advance on selected image data corresponding to selected ones of the plurality of images, in a processing order based on the set decoding priority, and prior to respective times at which each of the selected ones of the plurality of images is requested for display on the display screen, wherein the decoded selected image data is stored in the storage unit, and when respective ones of the selected ones of the plurality of images are requested for display on the display screen, corresponding decoded selected image data is retrieved from the storage unit, wherein when a user arbitrarily scrolls through the plurality of images being displayed on the display screen in a direction along which the plurality of images are arranged, advance decoding process is performed on image data of a according to the set decoding priority, the decoding priority having been set based on a predicted result of a future scroll manipulation of the plurality of images by the user and the decoding priority also indicating a likelihood that the images not currently displayed will be imminently requested for display, wherein the predicted result is indicative of which images not currently displayed will be displayed after performing of the future scroll manipulation of the plurality of images, wherein the plurality of images are not portions of any one single image, and wherein the plurality of images are displayed on the display screen as a list of sequentially arranged images.

* * * * *